(12) United States Patent
Borders et al.

(10) Patent No.: US 7,139,721 B2
(45) Date of Patent: Nov. 21, 2006

(54) SCHEDULING DELIVERY OF PRODUCTS VIA THE INTERNET

(76) Inventors: Louis H. Borders, 435 Tasso St., #300, Palo Alto, CA (US) 94301; Sunil Bhargava, 45 Sheldon Way, Hillsborough, CA (US) 94010; Joyo Wijaya, 125 Seminary Dr., Menlo Park, CA (US) 94025; Sandeep Nijhawan, 3591 Townsquare Dr., San Jose, CA (US) 95127

( * ) Notice: Subject to any disclaimer, the term of this patent is extended or adjusted under 35 U.S.C. 154(b) by 795 days.

(21) Appl. No.: 09/810,891

(22) Filed: Mar. 16, 2001

(65) Prior Publication Data

US 2001/0047285 A1    Nov. 29, 2001

Related U.S. Application Data

(60) Provisional application No. 60/247,828, filed on Nov. 9, 2000.

(51) Int. Cl.
*G06Q 99/00* (2006.01)
(52) U.S. Cl. .............................. 705/9; 705/8
(58) Field of Classification Search .............. 705/8, 705/9
See application file for complete search history.

(56) References Cited

U.S. PATENT DOCUMENTS

| | | | |
|---|---|---|---|
| 2,781,643 A | 2/1957 | Fairweather | |
| 3,406,532 A | 10/1968 | Rownd et al. | |
| 3,670,867 A | 6/1972 | Traube | |
| 4,213,310 A | 7/1980 | Buss | |
| 4,455,453 A | 6/1984 | Parasekvakos et al. | |
| 4,656,591 A | 4/1987 | Goldberg | |
| 4,799,156 A * | 1/1989 | Shavit et al. ................ | 705/26 |
| 4,887,208 A | 12/1989 | Schneider et al. | |
| 4,936,738 A | 6/1990 | Brennan | |
| 5,038,283 A | 8/1991 | Caveney | |
| 5,093,794 A | 3/1992 | Howie et al. | |
| 5,105,627 A | 4/1992 | Kurita | |
| 5,122,959 A | 6/1992 | Nathanson et al. | |
| 5,235,819 A | 8/1993 | Bruce | |
| 5,237,158 A | 8/1993 | Kern et al. | |
| 5,246,332 A | 9/1993 | Bernard | |
| 5,265,006 A | 11/1993 | Asthana | |
| 5,272,638 A | 12/1993 | Martin et al. | |
| 5,273,392 A | 12/1993 | Bernard | |
| 5,322,406 A | 6/1994 | Pippin et al. | |

(Continued)

FOREIGN PATENT DOCUMENTS

FR    2696722    4/1994

(Continued)

OTHER PUBLICATIONS

Pearce, Michael R., From Carts to Clicks, Ivey Business Quarterly, Autumn 1998, vol. 63 No. 1, pp. 69-71. [ProQuest].*

(Continued)

*Primary Examiner*—Romain Jeanty
*Assistant Examiner*—Andre Boyce

(57) ABSTRACT

Methods and apparatus for scheduling delivery of an order via a wide area network. A computer system associates a customer point value with each customer according to a customer point system. The customer point values is determined with reference to customer order data. The computer system then divides the customers into customer groups, each of which has a range of customer point values. The system determines an actual capacity allocation distribution among the customer groups based on the customer order data. The system adjusts the range of customer point values for customer groups to cause the actual capacity allocation distribution to converge to a target capacity allocation distribution.

21 Claims, 10 Drawing Sheets

U.S. PATENT DOCUMENTS

| | | | |
|---|---|---|---|
| 5,363,310 A | 11/1994 | Haj-Ali Ahmadi et al. | |
| 5,395,206 A | 3/1995 | Cerny, Jr. | |
| 5,428,546 A | 6/1995 | Shah et al. | |
| 5,533,361 A | 7/1996 | Halpern | |
| 5,548,518 A | 8/1996 | Dietrich et al. | |
| 5,593,269 A | 1/1997 | Bernard | |
| 5,615,121 A | 3/1997 | Babayev et al. | |
| 5,666,493 A | 9/1997 | Wojcik et al. | |
| 5,694,551 A | 12/1997 | Doyle et al. | |
| 5,712,989 A | 1/1998 | Johnson et al. | |
| 5,758,313 A | 5/1998 | Shah et al. | |
| 5,758,328 A | 5/1998 | Giovannoli | |
| 5,761,673 A | 6/1998 | Bookman et al. | |
| 5,768,139 A | 6/1998 | Pippin et al. | |
| H1743 H | 8/1998 | Graves et al. | |
| 5,809,479 A | 9/1998 | Martin et al. | |
| 5,826,242 A | 10/1998 | Montulli | |
| 5,826,825 A | 10/1998 | Gabriet | |
| 5,831,860 A | 11/1998 | Foladare et al. | |
| 5,832,457 A | 11/1998 | Cherney | |
| 5,834,753 A | 11/1998 | Danielson et al. | |
| 5,835,914 A | 11/1998 | Brim | |
| 5,839,117 A | 11/1998 | Cameron et al. | |
| 5,848,395 A * | 12/1998 | Edgar et al. | 705/9 |
| 5,878,401 A | 3/1999 | Joseph | |
| 5,880,443 A | 3/1999 | McDonald et al. | |
| 5,893,076 A | 4/1999 | Hafner et al. | |
| 5,894,554 A | 4/1999 | Lowery et al. | |
| 5,897,622 A | 4/1999 | Blinn et al. | |
| 5,897,629 A * | 4/1999 | Shinagawa et al. | 706/13 |
| 5,899,088 A | 5/1999 | Purdum | |
| 5,910,896 A | 6/1999 | Hahn-Carlson | |
| 5,918,213 A | 6/1999 | Bernard et al. | |
| 5,943,652 A | 8/1999 | Sisley et al. | |
| 5,943,841 A | 8/1999 | Wunscher | |
| 5,956,709 A | 9/1999 | Xue | |
| 5,963,919 A | 10/1999 | Brinkley et al. | |
| 5,979,757 A | 11/1999 | Tracy et al. | |
| 6,023,683 A | 2/2000 | Johnson et al. | |
| 6,061,607 A | 5/2000 | Bradley et al. | |
| 6,070,147 A | 5/2000 | Harms et al. | |
| 6,073,108 A | 6/2000 | Peterson | |
| 6,081,789 A | 6/2000 | Purcell | |
| 6,083,279 A | 7/2000 | Cuomo et al. | |
| 6,085,170 A | 7/2000 | Tsukuda | |
| 6,101,481 A | 8/2000 | Miller | |
| 6,140,922 A | 10/2000 | Kakou | |
| 6,178,510 B1 | 1/2001 | O'Connor et al. | |
| 6,185,625 B1 | 2/2001 | Tso et al. | |
| 6,215,952 B1 | 4/2001 | Yoshio et al. | |
| 6,233,543 B1 | 5/2001 | Butts et al. | |
| 6,249,801 B1 | 6/2001 | Zisapel et al. | |
| 6,260,024 B1 | 7/2001 | Shkedy | |
| 6,275,812 B1 | 8/2001 | Haq et al. | |
| 6,289,260 B1 | 9/2001 | Bradley et al. | |
| 6,292,784 B1 * | 9/2001 | Martin et al. | 705/11 |
| 6,324,520 B1 | 11/2001 | Walker et al. | |
| 6,332,334 B1 | 12/2001 | Faryabi | |
| 6,341,269 B1 | 1/2002 | Dulaney et al. | |
| 6,343,275 B1 | 1/2002 | Wong | |
| 6,397,246 B1 | 5/2002 | Wolfe | |
| 6,405,173 B1 * | 6/2002 | Honarvar et al. | 705/7 |
| 6,424,947 B1 | 7/2002 | Tsuria et al. | |
| 6,445,976 B1 | 9/2002 | Ostro | |
| 6,453,306 B1 | 9/2002 | Quelene | |
| 6,463,345 B1 | 10/2002 | Peachey-Kountz et al. | |
| 6,463,420 B1 * | 10/2002 | Guidice et al. | 705/28 |
| 6,490,567 B1 | 12/2002 | Gregory | |
| 6,496,205 B1 | 12/2002 | White et al. | |
| 6,505,093 B1 | 1/2003 | Thatcher et al. | |
| 6,505,171 B1 | 1/2003 | Cohen et al. | |
| 6,526,392 B1 * | 2/2003 | Dietrich et al. | 705/400 |
| 6,530,518 B1 * | 3/2003 | Krichilsky et al. | 235/375 |
| 6,567,786 B1 * | 5/2003 | Bibelnieks et al. | 705/14 |
| 6,571,213 B1 | 5/2003 | Altendahl et al. | |
| 6,578,005 B1 | 6/2003 | Lesaint et al. | |
| 6,598,027 B1 | 7/2003 | Breen, Jr. | |
| 6,622,127 B1 | 9/2003 | Klots et al. | |
| 6,654,726 B1 | 11/2003 | Hanzek | |
| 6,697,964 B1 | 2/2004 | Dodrill et al. | |
| 6,741,995 B1 * | 5/2004 | Chen et al. | 707/102 |
| 6,748,418 B1 | 6/2004 | Yoshida et al. | |
| 6,763,496 B1 | 7/2004 | Hennings et al. | |
| 6,862,572 B1 * | 3/2005 | de Sylva | 705/7 |
| 6,970,837 B1 | 11/2005 | Walker et al. | |
| 6,990,460 B1 * | 1/2006 | Parkinson | 705/10 |
| 2001/0037229 A1 * | 11/2001 | Jacobs et al. | 705/8 |
| 2001/0042021 A1 | 11/2001 | Matsuo et al. | |
| 2001/0047310 A1 | 11/2001 | Russell | |
| 2001/0049619 A1 | 12/2001 | Powell et al. | |
| 2001/0049672 A1 | 12/2001 | Moore | |
| 2002/0004766 A1 | 1/2002 | White | |
| 2002/0007299 A1 * | 1/2002 | Florence | 705/9 |
| 2002/0013950 A1 | 1/2002 | Tomsen | |
| 2002/0038224 A1 * | 3/2002 | Bhadra | 705/1 |
| 2002/0049853 A1 | 4/2002 | Chu et al. | |
| 2002/0065700 A1 | 5/2002 | Powell et al. | |
| 2002/0188530 A1 | 12/2002 | Wojcik et al. | |
| 2002/0194087 A1 | 12/2002 | Spiegel et al. | |
| 2003/0045340 A1 | 3/2003 | Roberts | |
| 2003/0079227 A1 | 4/2003 | Knowles et al. | |
| 2003/0233190 A1 | 12/2003 | Jones | |
| 2004/0236635 A1 * | 11/2004 | Publicover | 705/26 |
| 2005/0027580 A1 * | 2/2005 | Crici et al. | 705/8 |
| 2005/0144641 A1 | 6/2005 | Lewis | |

FOREIGN PATENT DOCUMENTS

| | | |
|---|---|---|
| GB | 2 265 032 A | 9/1993 |
| WO | WO99/07121 | 2/1999 |

OTHER PUBLICATIONS

Wren, Worth Jr., Cyber Supermarket Albertson's Expects Online Grocery Shopping to Boom, Fort Worth Star—Telegram, Fort Worth, Tx, Nov. 9, 1998, p. 23. [ProQuest].*

Hyten, Todd, Stop & Shop Mulls Online Grocery Service, The Boston Business Journal, Mar. 22, 1996, vol. 16 Issue 6, p. 1. [ProQuest].*

"Estimation of Consumer Demand with Stock-Out Based Substitution: An Application to Vending Machine Product", Anupindi, Ravi; Dada, Maqbool; Gupta, Sachin; Marketing Science; vol. 17, No. 4, 1998, pp. 406-423.

"Management of Multi-Item Retail Inventory Systems with Demand Substitution"; Smith, Stephen, Agrawal, Narendra; Operations Research; vol. 48, No. 1, Jan.-Feb., pp. 50-64.

Automatic ID News, "20/20 Results Achieved with Technology Trio", Sep. 1995, p. 19.

Henry Towie, "On the Fast Track with Totaltracks: UPS Deploys Mobile Date Service," Abstract No. XP-000560076, Document Delivery World, vol. 9, No. 3, 1993, pp. 30-31.

Hiroo Kawata, "Information Technology of Commercial Vehicles in the Japanese Parcel Service Business," Abstract No. XP-000560489, 1992, pp. 371-382.

Koster, Rene de, "Routing Orderpickers in a Warehouse: A Comparison Between Optimal and Heuristic Solutions," IIE Transactions, vol. 30, No. 5, p. 469, May 1998.

Maloney, David, "The New Corner Drugstore", May 1, 2000, Modern Materials Handling, vol. 55, No. 5, p. 58.

PC Foods, "Customer Service Agreement," printed from website: http://www.pcfoods.com, Abstract No. XP-002245026, 1999, pp. 1-2.

Takashi Sekita, "The Physical Distribution Information Network in the Home-Delivery Business," Japan Computer Quarterly, Abstract No. XP-00.431194, 1990, pp. 23-32.

The Impact of Electronic Data Interchange on Competitiveness in Retail Supply Chain, Brian Fynes et al., IBAR v14n2 pp. 16-2 1993.

van den Berg, Jeroen, P, "A Literature Survey on Planning and Control of Warehousing Systems", IIE Transactions vol. 31, No. 3, p. 751, Aug. 1999.

Vass et al., "The World Wide Web—Everything you (n)ever wanted to know about its server", IEEE, Oct./Nov. 1998, pp. 33-37.

Wilson, Joe, " Selecting Warehouse Management Software (WMS) for Food Distribution Operations", Frozen Food Digest, Oct. 1998, vol. 14, No. 1, p. 18.

Wunnava et al., "Interactive Multimedia on the World Wide Web", IEEE, Aug. 1999, pp. 110-115.

U.S. Appl. No. 09/568,570, filed May 10, 2000.
U.S. Appl. No. 09/568,571, filed May 10, 2000.
U.S. Appl. No. 09/568,572, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/620,199, filed Jul. 20, 2000.
U.S. Appl. No. 09/750,385, filed Dec. 27, 2000.
U.S. Appl. No. 09/792,400, filed Feb. 22, 2001.
U.S. Appl. No. 09/813,235, filed Mar. 19, 2001.

Norton, Tim R., "End-To-End Response-Time: Where to Measure?", Computer Measurement Group Conference Proceedings, CMG99 Session 423, Dec. 1999, pp. 1-9.

www.peapod.com, Including Introduction to Peapod; How Peapod Works; Peapod: Choosing a Delivery Time: Peapod: Sending Your Order; Retrieved from Internet Archive (web.archive.org) on Jul. 23, 2006, alleged date Nov. 13, 1996, pp. 1-9.

"Peapod Interactive Grocery Shopping and Delivery Service Now Delivers Via the Internet", Press Release, peapod.com, Apr. 22, 1996, pp. 1-2.

* cited by examiner

Average Shipment Size

| Threshold | | Points |
|---|---|---|
| less than 25 | | 0 |
| $ 25.00 ≤ | | 15 |
| 40.00 ≤ | | 20 |
| 55.00 ≤ | | 25 |
| 70.00 ≤ | | 35 |
| 85.00 ≤ | | 45 |
| 100.00 ≤ | | 50 |
| 115.00 ≤ | | 55 |
| 130.00 ≤ | | 60 |

Shipment Frequency

| Threshold Orders/Week | Points |
|---|---|
| less than .25 | 0 |
| $ 0.25 ≤ | 12 |
| 0.45 ≤ | 20 |
| 0.75 ≤ | 30 |
| 1.00 ≤ | 33 |
| 1.25 ≤ | 36 |
| 1.50 ≤ | 40 |

FIG. 9

| Customer | Customer Points | Group Name | Override Group Name | Override Expiration Date |
|---|---|---|---|---|
| Mary Smith | 61 | A3 | | |
| John Doe | 32 | A4 | A3 | 9/30/1999 |
| Joe Smith | 90 | A1 | A3 | 12/31/1999 |
| Sunil Bhargava | 50 | A3 | A1 | Null (no expiration) |

Input Screen

| Begin Date | 8/5/99 |
| End Date | 8/31/99 |

Capacity Allocation History

| Begin Date | 8/5/99 |
| End Date | 8/31/99 |

| Group | Minimum Points | Target Capacity Allocation | Actual Results |||||
|---|---|---|---|---|---|---|---|
| | | | Total Customers ||| Total Orders ||
| | | | Number | % | | Number | % |
| A1 | 86 | 32% | 5,290 | 23% | | 1,780 | 34% |
| New | | 20% | 5,750 | 25% | | 890 | 17% |
| A2 | 74 | 20% | 3,220 | 14% | | 1,151 | 22% |
| A3 | 54 | 16% | 2,990 | 13% | | 942 | 18% |
| A4 | 31 | 9% | 3,450 | 15% | | 366 | 7% |
| A5 | — | 3% | 2,300 | 10% | | 105 | 2% |
| Totals | | 100% | 23,000 | 100% | | 5,234 | 100% |

Worksheet to plan Groupings — 1100

| Group | Minimum Points (1012) | Recalculation Results — 1106 | |
|---|---|---|---|
| | 1104 | Minimum Points (1102) | Total Customers |
| | | | % | Number |
| A1 | 86 | 88 | 21% | 5,040 |
| New | | | 24% | 5,760 |
| A2 | 74 | 76 | 12% | 2,880 |
| A3 | 54 | 56 | 14% | 3,360 |
| A4 | 31 | 33 | 15% | 3,600 |
| A5 | | | 14% | 3,360 |
| Totals | | | 100% | 24,000 |

Recalculate — 1120
Submit — 1122

FIG. 12

Worksheet to Allocate Capacity — 1200

Expected Number of Orders: 18,000 — 1202

| Group (1010) | Target Capacity Allocation (1012) | Total Customers (1204) | | Target Orders (1206) | | |
|---|---|---|---|---|---|---|
| | | % | Number | Number | Per Week/Per Cust (1208) | |
| A1 | 32% | 21% | 5,040 | 5,760 | 1.1 | |
| New | 28% | 24% | 5,760 | 5,040 | 0.9 | |
| A2 | 12% | 12% | 2,880 | 2,160 | 0.8 | |
| A3 | 11% | 14% | 3,360 | 1,980 | 0.6 | |
| A4 | 10% | 15% | 3,600 | 1,800 | 0.5 | |
| A5 | 7% | 14% | 3,360 | 1,260 | 0.4 | |
| Totals | 100% | 100% | 24,000 | 18,000 | 0.8 | |

Recalculate — 1220
Submit — 1222

|  |  | 8:00 | 8:30 | 9:00 | 9:30 | 10:00 | 10:30 | 11:00 | 11:30 | 12:00 | 12:30 | 13:00 | 13:30 | 14:00 |
|---|---|---|---|---|---|---|---|---|---|---|---|---|---|---|
| 02/10/2001 | Sun | X |  |  |  |  | X | (X) | X | X | X | X | X |  |
| 02/11/2001 | Mon |  |  |  | H |  | H | (X) | (X) | X | X | X | H |  |
| 02/12/2001 | Tue |  |  |  |  |  |  | (X) | (X) | (X) | X | H |  |  |
| 02/13/2001 | Wed |  |  |  |  |  |  | (X) | (X) | (X) |  |  |  |  |
| 02/14/2001 | Thu |  |  |  |  |  | (X) | (X) | (X) | (X) |  |  |  |  |
| 02/15/2001 | Fri |  |  |  |  |  | (X) | (X) | (X) | (X) |  |  |  |  |
| 02/16/2001 | Sat |  |  |  |  |  | (X) | (X) | (X) | (X) |  |  |  |  |

*FIG. 13*

SCHEDULING DELIVERY OF PRODUCTS VIA THE INTERNET

CROSS-REFERENCE TO RELATED APPLICATIONS

This application claims priority under 35 U.S.C. 119(e) from U.S. Provisional Patent Application No. 60/247,828 for "SCHEDULING DELIVERY OF PRODUCTS VIA THE INTERNET" (Borders, et al.) filed on Nov. 9, 2000, which is incorporated herein by reference for all purposes. This application also claims priority under 35 U.S.C. 120 from commonly assigned, co-pending U.S. patent application Ser. No. 09/568,613 for "SCHEDULING DELIVERY OF PRODUCTS VIA THE INTERNET" (Kantarjiev et al.), which is incorporated herein by reference for all purposes.

BACKGROUND OF THE INVENTION

The present invention relates to the field of electronic commerce. In particular, the invention relates to a technique for selling and delivering consumer products to customers using a data network. Still more specifically, the present invention provides methods and apparatus by which scheduling of deliveries for products ordered through the present system is provided via the Internet.

Electronic commerce via the Internet is rapidly changing the way in which products and services are purchased by and delivered to consumers. An important challenge faced by most businesses engaging in commerce over the Internet relates to the manner in which their products actually get to consumers.

Most Internet retailers rely on third party services such as UPS and Federal Express to deliver the products purchased on their sites. This model has some advantages for the retailers in that they don't have to invest in and develop delivery infrastructures. However, the downside is the potential negative effects such a model has on customer satisfaction. That is, once an order is picked up from the retailer by the delivery service, the retailer loses control of the remainder of the transaction and runs the risk that any mistakes by the delivery service will reflect negatively on the retailer. For example, the retailer lacks the ability to deliver products during precise delivery windows. Rather they must rely on the delivery service which may make the customer wait around for inconveniently long periods of time.

In addition, if the customer's order is damaged or incorrect, there is no immediate recourse for the customer because the delivery service is not controlled by the retailer. The customer must typically go through a rather cumbersome process to return the order using the same or some other third party delivery service. This can intensify any feelings of frustration the customer might have with regard to the error. Obviously this is undesirable from the retailer's perspective.

In view of the foregoing, there is a need for techniques which allow e-commerce retailers to efficiently develop effective delivery capabilities. More specifically, there is a need for techniques by which such retailers may effect precise delivery of their products to customers.

SUMMARY OF THE INVENTION

According to the present invention, methods and apparatus are provided by which the delivery of products ordered over the Internet may be scheduled in an effective and precise manner. The techniques described herein allow an e-commerce retailer to communicate precise available delivery windows to a customer over the Internet which reflect an accurate picture of the product and delivery resources which are actually available at the time the customer schedules the delivery. That is, when a customer indicates that scheduling of a delivery is desired, the system of the present invention computes and displays the available delivery windows to the customer which, according to a specific embodiment, are half-hour windows. The techniques of the present invention are then able to schedule the delivery window selected by the customer without compromising any previous commitments made to other customers. This is accomplished by generating the delivery window grid and scheduling the selected window with reference to available resource capacity which is reflective of the previous commitments.

Thus, the present invention provides methods and apparatus for associating a customer point value with each customer according to a customer point system. One embodiment of a computer system according to the present invention divides the customers into customer groups, each of which corresponds to a range of customer point values. Each customer is assigned to one of the customer groups according to the associated customer point value. The system determines an actual capacity allocation distribution among the customer groups with reference to the customer order data. Then, the system or the administrator of the system adjusts the range of customer point values associated with customer groups to cause the actual capacity allocation distribution to converge to a target capacity allocation distribution.

According to another embodiment, methods and apparatus are described for determining which of the plurality of delivery windows are available for delivery of an order with reference to currently available system resources and a customer profile.

A further understanding of the nature and advantages of the present invention may be realized by reference to the remaining portions of the specification and the drawings.

BRIEF DESCRIPTION OF THE DRAWINGS

FIG. 9 is a table illustrating an example of customer point values, customer groups, override groups, and override expiration dates.

FIG. 10 is a diagram illustrating an exemplary capacity allocation history screen for use with the computer system of an embodiment of the present invention.

FIG. 11 is a worksheet to plan groupings displayed on the computer screen for use with the present invention.

FIG. 12 is a worksheet to allocate capacity displayed on the computer screen for use with the present invention.

FIG. 13 is an exemplary view of delivery window grid generated by the system of the present invention.

DETAILED DESCRIPTION OF SPECIFIC EMBODIMENTS

Figure 1:
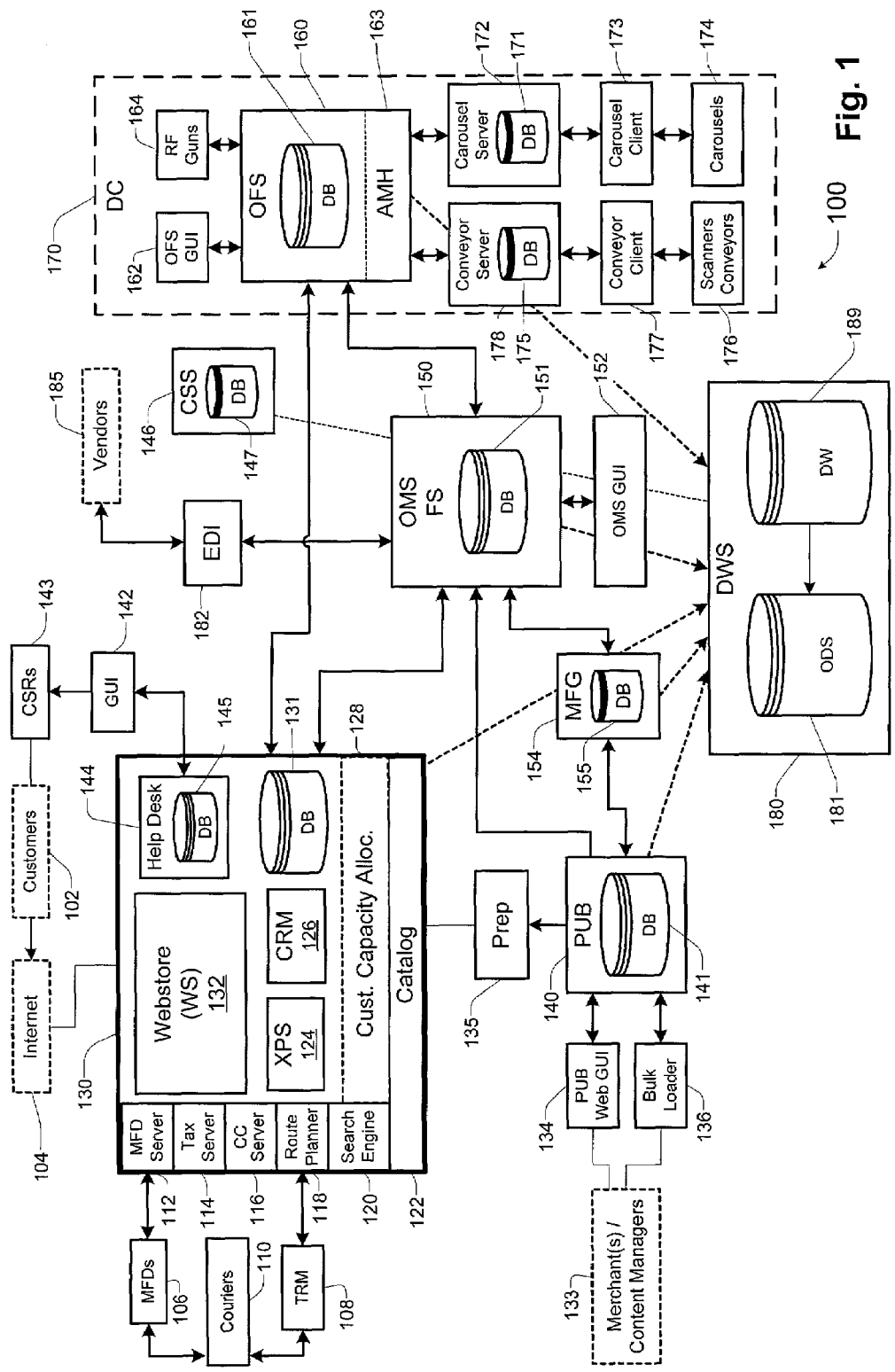
FIG. 1 is a block diagram of an integrated system architecture in accordance with a specific embodiment of the present invention.

FIG. 1 shows a schematic block diagram illustrating various systems, subsystems and/or components of an integrated system architecture 100 for use with a specific embodiment of the present invention. The system of FIG. 1 as well as other systems which may be used in conjunction with the present invention are described in greater detail in copending U.S. patent application Ser. No. 09/568,603 for INTEGRATED SYSTEM FOR ORDERING, FULFILLMENT, AND DELIVERY OF CONSUMER PRODUCTS USING A DATA NETWORK filed on May 10, 2000, the entire disclosure of which is incorporated herein by reference in all its entirety. As shown in FIG. 1, system 100 includes a plurality of subsystems and other components for effecting electronic commerce over a data network. It will be understood that portions of the various subsystems described herein are embodied in computer program instructions stored in corresponding computer-readable media. A brief description of at least a portion of the plurality of subsystems of system 100 is presented below. System 100 of FIG. 1 includes:

(1) a Publishing (PUB) Subsystem 140 which manages SKU and catalog information (e.g. SKUs, UPCs, products, categories, descriptive attributes, etc.), and provides an interface to merchants 133;

(2) a Webstore Subsystem (WS) 132 which manages the on-line store interface with customers, including customer shopping and ordering transactions;

(3) a Transportation Subsystem (XPS) 124 which manages delivery window scheduling, delivery vehicle routing, capacity planning, and mobile field device (MFD) data used by delivery couriers;

(4) an Order Management Subsystem (OMS) 150 which manages pricing data, item availability data, inventory data, vendor data, finance, procurement, etc;

(5) an Order Fulfillment Subsystem (OFS) 160 which facilitates the fulfillment of customer orders and manages the distribution center (170) operations; and (6) a Customer Relationship Management (CRM) Subsystem 126 for enabling customer service representatives (CSRs) 143 to service customer requests and track customer interaction.

According to specific embodiments, each subsystem may also comprise at least one server and/or other components. Further, each subsystem may be configured to utilize a dedicated or shared database server as its persistent and transactional data backbone. Users or customers may access data stored on one of the subsystem's database servers (e.g. Webstore database), which then executes appropriate business logic and/or business objects.

Each subsystem may be configured or designed to communicate with each other via a plurality of interfaces. According to a specific embodiment, the plurality of interfaces includes both synchronous and asynchronous interfaces. Many of the various system interfaces are configured to be asynchronous, wherein data is typically transferred in batch mode via staging (e.g. database) tables or flat files (e.g., separated value files). However, at least a portion of the system interfaces are configured as synchronous interfaces. Generally, a synchronous interface may be used where an immediate response from a server or component is required.

Conceptually, system 100 of FIG. 1 may be grouped into two general subsystems, namely a Front Office system and a Back Office system. The Front Office system is generally responsible for functions related to customer transactions such as, for example, customer orders, billing transactions, delivery scheduling, customer service, etc. In the embodiment of FIG. 1, for example, the Front Office system 130 comprises the Webstore Subsystem 132, Transportation Subsystem 124, and Customer Relationship Management Subsystem 126. The Front Office system 130 may also include other subsystems or components such as, for example, mobile field device (MFD) components 112, a tax component 114, a billing component 116, a delivery route planning component 118, a search engine 120, a catalog component 112, a Help Desk component 114, a customer capacity allocation component 128, etc.

Additionally, the Front Office system 130 may include a centralized database 131 which may be accessed by subsystems and/or components of system 100. Alternatively, one or more of the Front Office systems and/or components may each comprise a respective database which is accessible by other subsystems and/or components of system 100.

The Back Office system generally includes all subsystems and/or components which are not part of the Front Office system. Thus, as shown in FIG. 1, for example, the Back Office system includes the PUB 140, OMS 150, and OFS 160 subsystems. However, the invention is not limited to the particular embodiment shown in FIG. 1, and it will be appreciated that the specific configuration of system 100 may be modified by one having ordinary skill in the art to suit specific applications.

As shown in FIG. 1, the Front Office 130 comprises a plurality of separate subsystems such as, for example, Webstore Subsystem (WS) 132, Transportation Subsystem (XPS) 124, and Customer Relationship Management (CRM) Subsystem 126. Each subsystem may be implemented via a combination of hardware and/or software, and further may include a plurality of different functional components, modules, and/or plug-in applications.

At least a portion of the software residing at the Front Office system may include a presentation layer, an application layer, a business object layer, a database access layer, or any combination thereof. According to a specific embodiment, the presentation layer handles the actual presentation of information to users via an appropriate medium. The application layer handles the appropriate application logic for the various subsystems of the Front Office. For example, in the Webstore Subsystem 132, it is the application layer (referred to as the shopping engine) which determines that a customer cannot check out an order unless the customer has selected a delivery window, or provided billing information. The business object layer (referred to as the Bobo-Bucket of business objects) provides objects with a fixed set of functionality (e.g. methods or procedures) that may be manipulated by the application layer. According to a specific embodiment, the business objects do not know about each other, and the application layer handles the coordination between the various business objects. The database access layer provides connectivity and data access APIs to the Front Office database 131 (also referred to as the Webstore database). According to a specific embodiment, the database access layer performs pooling and caching of connection objects, where appropriate.

It is also important for a common database schema to be adopted by each of the Front Office systems. According to a specific embodiment, the database 131 is implemented as a shared database which may be accessed by each of the Front Office systems.

The Webstore Subsystem (WS) 132 provides an interface for enabling customers to access the on-line store (e.g. Webstore). In a specific embodiment where the Webstore is implemented as a website on the World Wide Web, customers may access the Webstore via the Internet or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the Webstore interface is implemented using a secure http protocol (HTTPS), commonly known to those skilled in the art.

In accordance with a specific embodiment, the Webstore Subsystem 132 supports a number of customer related features such as, for example, self registration; accessing of customer account information; browsing of product categories and category hierarchy; viewing of product images and product information; key word searches; delivery scheduling; accessing of customer order history; customizable shopping lists; on-line shopping and ordering; etc.

The Webstore Subsystem (referred to as the Webstore) may be implemented using at least one server which is connected to the data network. According to a specific embodiment, the Webstore is implemented using a plurality of web servers (e.g. web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing the Front Office database via the data network.

According to a specific implementation, the presentation layer of the WS software is implemented in ASP, which generates HTML data that is sent back to the customer browser. The application software layer or shopping engine layer may be implemented as COM objects. The business object layer of the software may provide the following business objects: (1) a customer object which implements customer functionality and attributes; (2) a catalog object which implements the product category hierarchy, SKUs, price, and available-to-promise (ATP) information; (3) an order object which implements the shopping cart, order management, billing, and check-out procedures; (4) a session object which implements state over HTTP; and (5) a delivery object which implements customer delivery scheduling. Further, the WS is preferably configured or designed to minimize customer response time and to provide for scalability.

Additionally, as shown in FIG. 1, the Front Office system may include a number of integrated components which provide additional functionality. For example, the WS may include a plurality of components which provide additional functionality such as, for example, computation of taxes, search capability, credit card billing, etc. Thus, as shown in FIG. 1, for example, the WS 132 includes at least one catalog component 122; a tax computation component 114 for computing taxes for each order line item that is sold; a search component 120 for processing text search requests; and a credit (or debit) card server (CC) component 116 for handling credit and/or debit card authorizations and funds captures. According to at least one embodiment, one or more of these components may be implemented as an asynchronous process in order to reduce or minimize impact on the Webstore server's response time and availability.

The Transportation Subsystem (XPS) 124 generally handles delivery window scheduling, delivery vehicle routing, capacity planning, and mobile field device programming used by delivery couriers. Accordingly, the Transportation Subsystem may be configured to provide the following functional features: (1) delivery grid computation and presentation; (2) delivery scheduling, and delivery window reservation; (3) deliveries to customer sites with appropriate billing actions and processing, including processing of adjustments, credits, and returns; (4) adjusting delivery operation parameters such as, for example, truck route plans, delivery vehicle usage, service duration, parking time, delivery courier scheduling, data to be downloaded into MFDs, etc.; (5) changing order state based on cutoff time; and (6) capacity management.

As shown in FIG. 1, for example, the Transportation Subsystem 124 may comprise a plurality of components and/or other subsystems including, Route Planner 118, MFD server 112, mobile field devices 106, transportation resource management (TRM) software 108, couriers 110, and customer capacity allocator 128. In alternate embodiments, at least a portion of these components such as, for example, the MFD server 112, may be implemented as a separate subsystem and may reside external to the Transportation Subsystem.

Route Planner 118 provides an interface to access the transportation resource management (TRM) software 108. According to a specific embodiment, the TRM component may keep track of the current state of all delivery windows which may be organized according to a per-zone basis. Delivery vehicles may be assigned to zones as part of the delivery planning. The Route Planner 118, working in conjunction with TRM 108, allocates specific routes and stops to specific delivery vehicles. Preferably, a stop will be scheduled for a particular customer within that customer's selected delivery time window. When a customer selects a delivery window, the delivery window business object submits the request to the Transportation Subsystem's Route Planner 118. The Route Planner then performs a verification check to verify that the selected delivery window can be promised to the customer.

Although the MFD server 112 may conceptually be grouped with the Transportation Subsystem, in a specific embodiment, the MFD server component 112 may configured to include at least one back-end server which resides in a particular area data center. Thus, different areas may be serviced by different MFD servers. The same may be said for Route Planner 118. Moreover, each zone in a particular area may be serviced from a station which may be connected to the area data center via the data network. Each mobile field device (MFD) unit or client 106 may connect to an area MFD server 112 via the data network, and download and/or upload various types of information, including, for example, customer order history information, delivery information (e.g. vehicle delivery routes, stops, etc.), customer returns information, credits, adjustments, etc.

The Customer Relationship Management Subsystem 126 is an interactive application which may be used by customer service representatives (CSRs) 143 to manage customer service requests and to track customer interaction. The functionality provided by the CRM subsystem may include, for example, accessing customer information; issuing credits for various customer issues (e.g. complaints, returns, damaged goods, etc.); handling work flow for processing customer issues; etc. The CRM subsystem provides CSRs (sometimes referred to as customer service operators—CSOs) with the ability to access, view, and edit customer information in accordance with customer requests.

The Order Fulfillment Subsystem 160 manages all functionality of the distribution center (DC) 170. In the embodiment of FIG. 1, the OFS includes appropriate hardware and/or software for managing the DC facility 170, including, for example, a warehouse management system (e.g. software application), at least one database 161, at least one interface 162, and an automated material handling (AMH) controller component 163, which manages the conveyor, carousel, and scanner components. In a specific implementation, the Order Fulfillment Subsystem 160 may be implemented using a warehouse management system such as, for example, the MOVE warehouse management system provided by Optum, Inc. of Costa Mesa, Calif. The warehouse system also provides the interface with the Order Management Subsystem. In a specific embodiment, this interface is implemented using a business host interface (BHI). The warehouse management subsystem may also provide the interface for allowing the OMS subsystem to communicate with the OFS database 161.

The Order Management Subsystem (OMS) 150 manages a variety of aspects related to the integrated system architecture of the present invention, including, for example, pricing, availability, inventory, vendors, financials, procurement, and data flows between various subsystems. OMS includes an inventory component which is responsible for maintaining inventory records, determining inventory availability, and replenishment of inventory stock. OMS subsystem 150 includes graphical user interface 152, and at least one database 151 for storing various data received from at least a portion of the other subsystems.

The Order Management Subsystem may be configured to support both asynchronous and synchronous interfaces with the other subsystems. In a specific embodiment, the OMS is configured to support an asynchronous interface with each of the other subsystems. This configuration provides a number of advantages described in greater detail below. Additionally, each OMS interface is configurable, and may be configured to support the running of batch processes as often as is desirable.

According to a specific implementation, all PUB-OMS and WS-OMS interface programs are configured to operate at the database schema level. New and updated data may be posted to a persistent message queue (e.g. staging tables) within the data source database. From there, the data may be processed into the destination database.

Implementation of the various interfaces between OMS and the other subsystems may be accomplished using a variety of different techniques commonly known to one having ordinary skill in the art. The following description provides an example of at least one such technique which may be used for interfacing OMS with the other subsystems. However, it will be appreciated that the specific interfaces described below may be implemented using other techniques commonly known to those skilled in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

Figure 2:
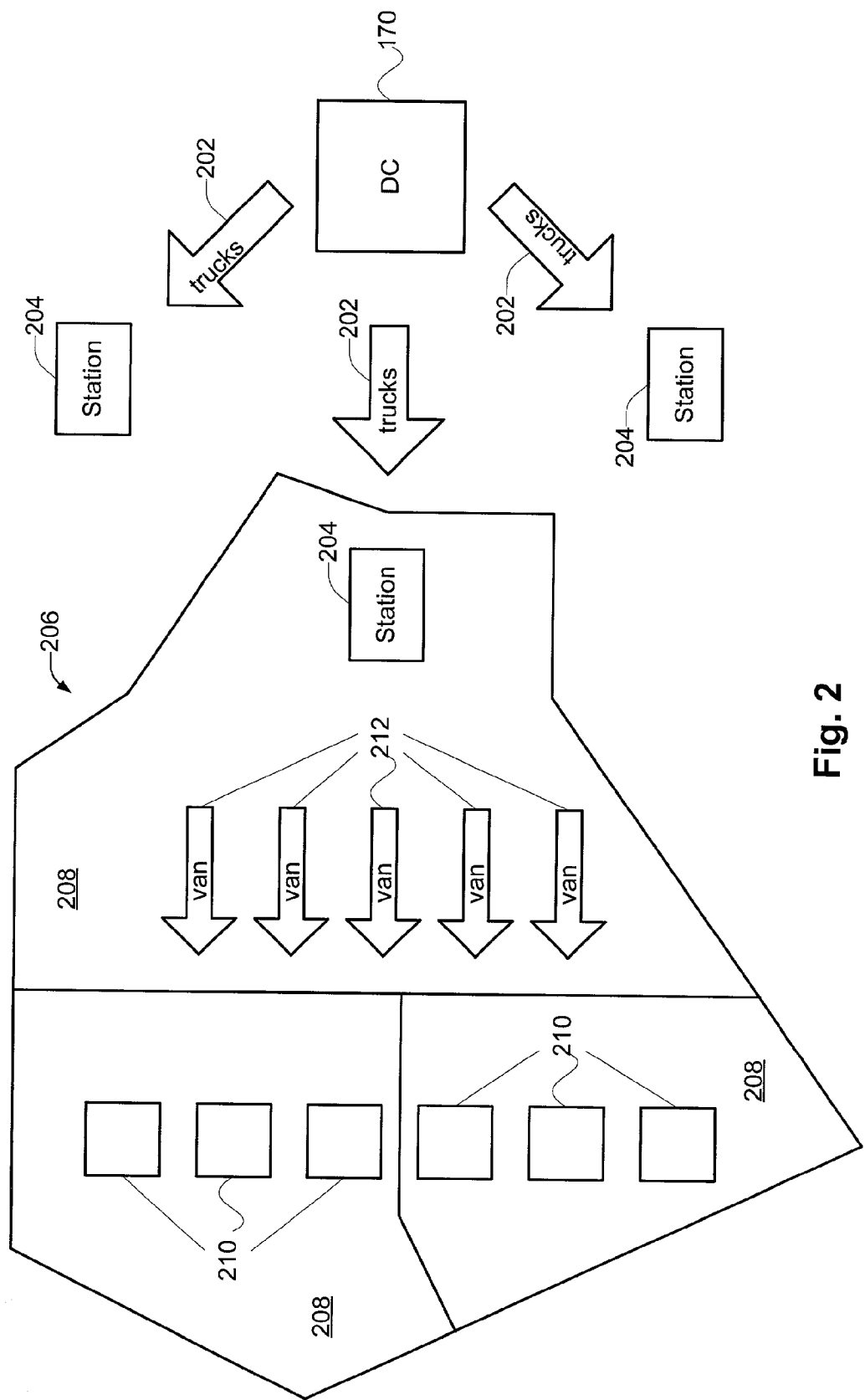
FIG. 2 is a diagram illustrating a "hub and spoke" distribution system according to a specific embodiment of the present invention.

FIG. 2 illustrates the "hub and spoke" nature of a product distribution system designed according to a specific embodiment of the invention. Trucks 202 leave Distribution Center (DC) 170 to deliver customer orders to a plurality of stations 204 each of which is associated with a zone 206. Each zone 206 may be divided into a plurality of subzones 208 each of which may contain a plurality of customer stops 210. A plurality of vans 212 is associated with each station 204 for delivery the customer orders to the appropriate customer stops 210. The orders (comprising one or more totes) on trucks 202 are transferred to vans 212 at stations 204 which then execute an assigned van route according to the delivery schedule generated as described below.

Figure 3:
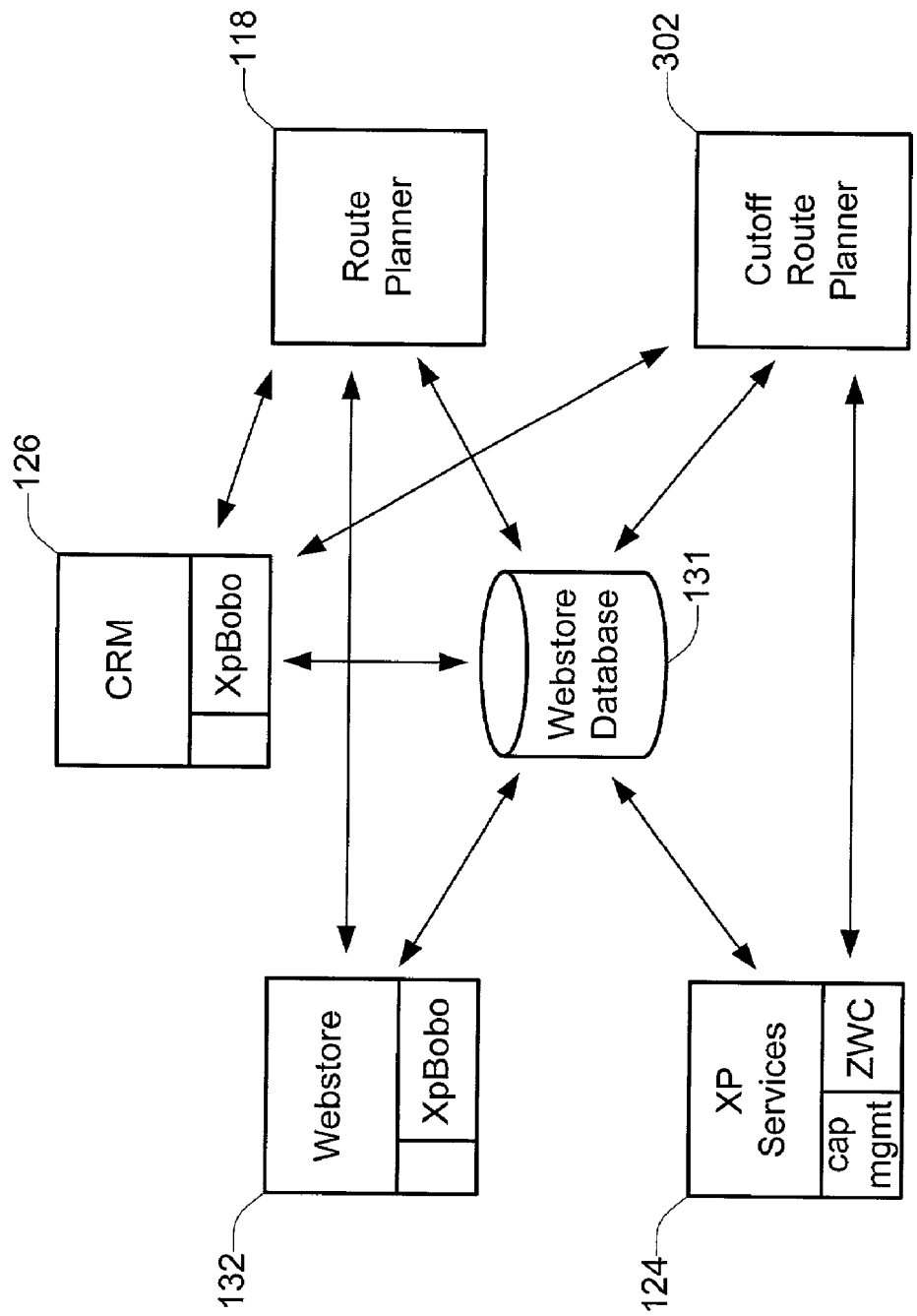
FIG. 3 is a flow diagram which illustrates the interactions between software modules which effect the delivery scheduling process according to a specific embodiment of the present invention.
Figure 4:
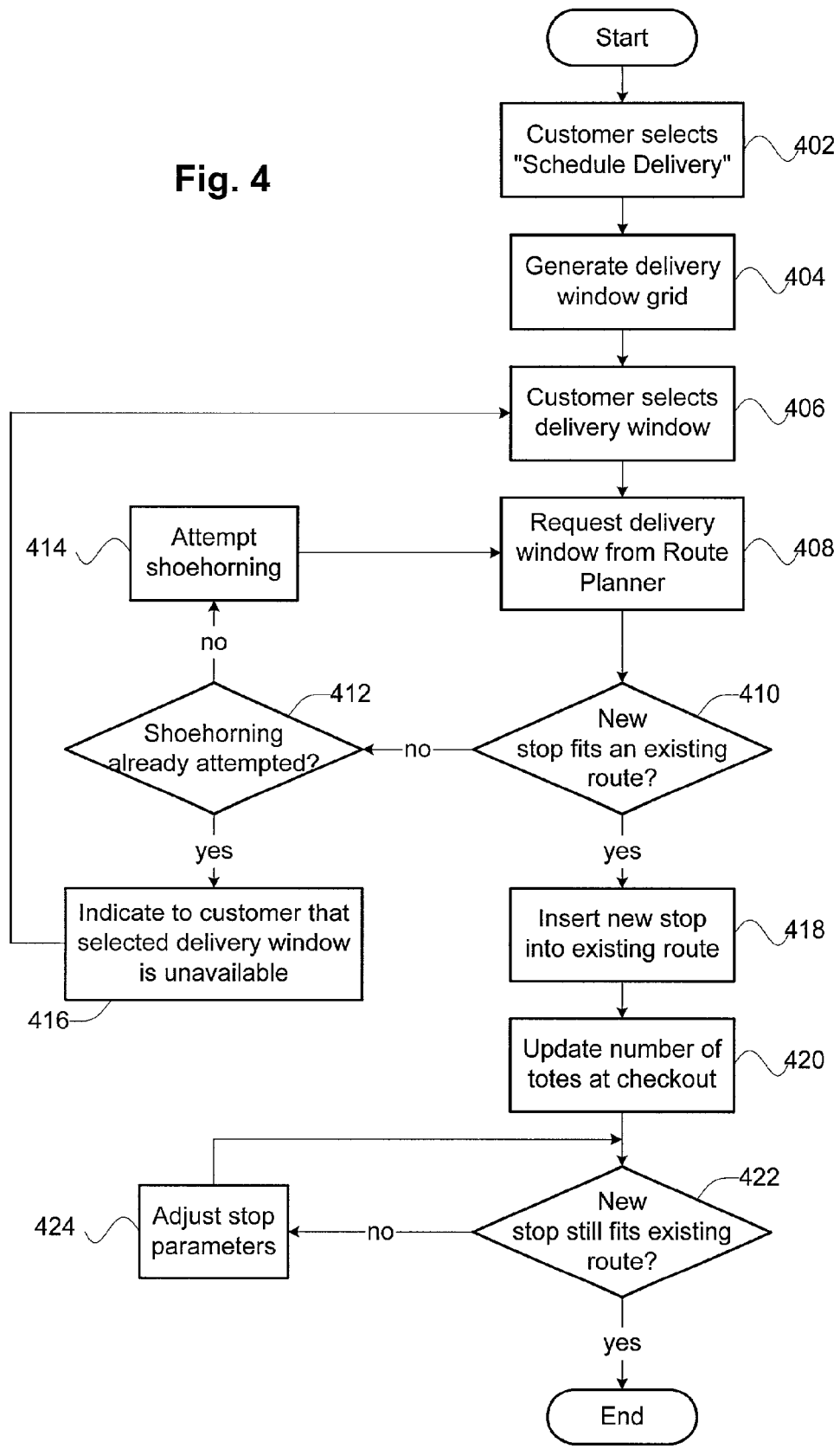
FIG. 4 is a flowchart illustrating the delivery scheduling process according to a specific embodiment of the invention.

A specific embodiment of a delivery scheduling process will now be described with reference to FIGS. 3 through 5. When the customer selects "Schedule Delivery" in the Webstore interface (402) XpBobo in WS subsystem 132 generates and presents a delivery window grid to the customer (404), generation of which will be described in greater detail below with reference to FIG. 5. When the customer selects one of the available delivery windows (406), XpBobo sends the new van stop and the set of routes to the Route Planner 118 for scheduling of the new van stop on any of the routes (408). According to a specific embodiment, this is done by computing the actual distance between stops using driving speeds and a variety of other parameters including, for example, whether or not the selected delivery window is during rush hour. According to a specific embodiment, the scheduling of the new stop on a route already having scheduled stops is favored. This is achieved by using a cost model which penalizes adding the stop to a new route but which doesn't add any cost for adding the first several, e.g., 6, stops to the new route. According to a specific embodiment, the Route Planner module employs third party software (i.e., TRM 108) called SOC provided by Descartes of Toronto, Ontario, Canada.

If Route Planner 118 cannot place the new stop on any of the routes (410), it may attempt to do so through a process referred to herein as "shoehorning" as long as shoehorning hasn't already been attempted (412 and 414). That is, according to a specific embodiment, XpBobo reduces the service duration (described below) originally set for the new stop and calls the Route Planner to try again with the new value. According to various embodiments, this shoehorning procedure may be repeated some set number of times. If the stop still can't be fit in (410) and no more shoehorning is desired (412), then a message is presented to the user indicating that the selected delivery window is unavailable (416). If, on the other hand, the new stop does fit into an existing route (410), it is inserted into the route (418).

According to a specific embodiment, when the delivery window grid is generated, XpBobo makes the assumption that the customer's order will correspond to some number of totes. According to a more specific embodiment, the number is the same for all customers and corresponds to, for example, the average order size in the system, e.g., three. According to an alternative embodiment, the number of totes assumed is based on the particular customer's past order history; e.g., if the customer averages 12 totes per order, the delivery window grid is generated based on the assumption that the customer's order will correspond to 12 totes this time. However, if the customer has no past order history, the delivery window grid is generated based on an estimated size of the order, which is calculated from, for example, the average order size in the system.

Referring back to FIG. 4, the number of totes is estimated and updated at checkout (420) based on the items in the customer's cart and information in the catalog about the volume of those items. This is necessary because in scheduling delivery, the customer is reserving a number of different types of capacity, e.g., van capacity, service duration (i.e., the amount of time allotted for bringing the totes into the customer's home may change with the number of totes), etc. Thus, at checkout, XpBobo again contacts the Route Planner with the updated number of totes for the purpose of updating the schedule. Any excess capacity recovered as a result of this updating is then returned to the system. If the number of totes does not fit into the van (known as "overloading"), the number will be reduced accordingly until the number fits into the van. The correct number of totes is also recorded and the extent of the overload is computed.

It is possible that when the Route Planner recomputes the schedule that the actual size of the order pushes one or more subsequent stops out of their delivery windows in which case the Route Planner rejects the order. That is, if the customer's stop no longer fits into an existing route (422), XpBobo may adjust some parameters associated with the stop (424), e.g., the number of totes or the service duration, and resends the request to the Route Planner until the order is accepted.

According to another embodiment, even where the customer's stop does not fit into an existing route, it is nevertheless scheduled in the selected window. The window violations are then either taken care of later, e.g., during a nightly optimization, or handled on a case-by-case basis by the operations staff.

Each night, another client of Route Planner 118 specifies groups of jobs to be optimized together. This typically opens up additional slack time, i.e., time periods in existing routes, in which additional stops may be scheduled the next day.

An additional optimization occurs at cutoff time, i.e., the time at which the orders on a set of van routes are sent to the OFS for fulfillment, by Cutoff Route Planner 302. This provides some fine tuning of the routes as well as takes care of last minute cancellations by customers. According to a specific embodiment, where there are multiple deliveries to a single address, this additional optimization may collapse them into a single delivery.

Each service area, e.g., the San Francisco Bay Area or Atlanta, is divided into zones corresponding to a particular station, each of which may be further divided into subzones. Each of the zones and subzones have tables associated therewith which have a plurality of parameters including open hours, service duration, parking time, etc. For example, for a particular subzone 6 minutes might be allocated for parking instead of 2 minutes for a different subzone. Further detail regarding these parameters will be discussed below.

According to a more specific embodiment, there is an additional layer of lookup logic in which an address or address range is associated with a specific latitude/longitude pair and subzone without using the geocoder module and the polygon interior test. Instead, a direct lookup in a database table is performed. This allows the capability to correct geocoding errors, assign specific addresses to special subzones, and to deny service to addresses that are otherwise in a valid service area without having to edit the subzone boundary polygons.

When a customer registers with Webvan, a geocoder module provided by Descartes takes the delivery address and determines a latitude and longitude pair which Xpbobo then uses to perform a polygon-interior test to determine if the delivery address is in any of its delivery subzones. Each subzone may include multiple polygons. If the address is not in one of the delivery subzones, the registration module indicates to the user that the user's area is not currently being serviced. According to a specific embodiment, the registration module recognizes when the delivery address is associated with another metropolitan area serviced by Webvan (e.g., by looking at the zip code) and provides the appropriate URL to the user.

If the specified delivery address is within an existing subzone, the address is associated with the appropriate zone and subzone and the corresponding table values. When a customer schedules a delivery, the set of routes and the open hours used in the various transactions including the delivery window grid generation are based upon the table values for the zone and subzone corresponding to the customer's address. The values for a particular zone are inherited by its subzones but may be overridden. The open hours for a particular subzone would, for example, override the open hours for the enclosing zone if different. Thus, a particular downtown area may be closed for deliveries during rush hour while adjacent, less congested areas remain open.

There are five values of interest to the delivery scheduling process which may be specified on the zone, subzone, or customer address level. Parking time, base service duration, per tote service duration, step threshold, and step duration. The beginning of the service duration for a particular delivery stop must fall within the promised window while the parking time does not need to. That is, the driver may park the van before the delivery window, but may not ring the customer's doorbell until the delivery window begins.

According to a specific embodiment, parking time is a fixed value for each subzone (or even for a particular customer) which may evolve over time based on feedback from drivers. The base service duration is the basic amount of time it takes to execute a delivery which may be specified at the zone, subzone, and customer address levels. The per tote service duration is a number of seconds added to the base service duration for each tote in the order.

Step threshold and step duration attempt to capture the fact that certain orders may require multiple trips between the van and the delivery location to unload all of the totes. Step threshold identifies how many totes the driver can carry at once which may be set to take information about the specific customer residence into account, e.g., the driver can only carry one tote because of access difficulties. The step duration is the amount of time to add to the base service duration for each step threshold reached by the current order. That is, if the step threshold is 3 and there are 8 totes, 2 step durations are added to the base service duration. Thus, the total service duration=base service duration+n per tote service durations+m step durations, where n is the number of totes in the order and m is the number of step thresholds exceeded.

In the WS database there are two tables which relate to delivery scheduling. The first table is the Van Routes Table which contains all of the available van routes with their constraints. Rows in this table are created by XP services component 124 called the Zone Window Creator (ZWC) which runs once a day, e.g., at night, and posts the van routes data to the WS database. Each entry in this table corresponds to a window of time during which a delivery resource, e.g., a van, will be deployed from a particular station to service stops. These zone delivery windows are also created with reference to the delivery hours in effect for that zone.

The second table is the Van Stops Table each entry of which corresponds to a customer order which needs to be serviced. Most van stops have a pointer which points to a van route in the Van Route Table and includes the estimated time of arrival and departure if the stop can be serviced. That is, van stops may be created and stored in this table even where it turns out they can't be serviced. In such instances, these entries do not have pointers to particular van routes.

The ZWC creates van routes for the Van Routes Table with reference to truck route plans each of which identifies when a truck is scheduled to leave the Distribution Center and when it is scheduled to arrive at a particular station. According to a specific embodiment, system constraints dictate that when a truck reaches a station there must be a set of vans either at the station or about to return to the station. Each route corresponds to the time period when a particular van is out servicing stops. When the same van returns to the station and then leaves again, it corresponds to a different route.

The ZWC also refers to the "open hours" for each area and zone, the number of vans available in each zone, and a parameter called "stagger duration" which reflects the fact that vans will arrive back at the station at staggered intervals relative to a particular truck arrival from the DC to ensure that all of the delivery windows are covered by at least one van. Using all of this information, the ZWC generates the van routes each of which indicates when a particular van is scheduled to leave the station to service stops and when it is expected to return. If, for example, three truck arrivals are scheduled for a particular station on a given day, there are three routes created by the ZWC for each van at that station.

According to an alternative embodiment, the van return times are not necessarily constrained by truck arrivals at the station. For example, if a van has enough capacity to stay out longer than the time between truck arrivals at the station, then that van is allowed to stay out servicing stops despite the scheduled arrival of a truck at the station. According to this embodiment, vans are only brought back to the station when they are empty.

The generation of the delivery window grid referred to in FIG. 4 will now be described with reference to FIG. 5. In response to a user selecting "Schedule Delivery" in the Webstore interface, the delivery grid estimator portion of XpBobo, generates the delivery window grid with reference to the Van Routes, Van Stops tables, and the current customer's latitude and longitude. According to a specific embodiment, the delivery window grid represents seven days, each having 20–25 half-hour windows (depending upon the open hours for the particular zone). The grid represents 7 times 4 sets of 3–6 routes. That is, 7 days times 4 truck waves from the DC per day times 3–6 van routes per wave. A plurality of half-hour windows can be combined to form a 60-minute window, a 90-minute window, and the like, which can also be overlapped with each other.

For each existing van route in the user's service zone, the process computes the "slack time" between each pair of existing stops on the route to determine whether there is sufficient time to deliver a standard load to the user's address. If there are no stops on the route, i.e., the route is still empty, the slack time for that route is the entire duration of the route. The process also determines whether there is enough free capacity on the van to accommodate the customer's order. According to a specific embodiment, if there is not sufficient van capacity, XpBobo determines whether a "recharge" trip to the station is possible between two stops.

Figure 5:
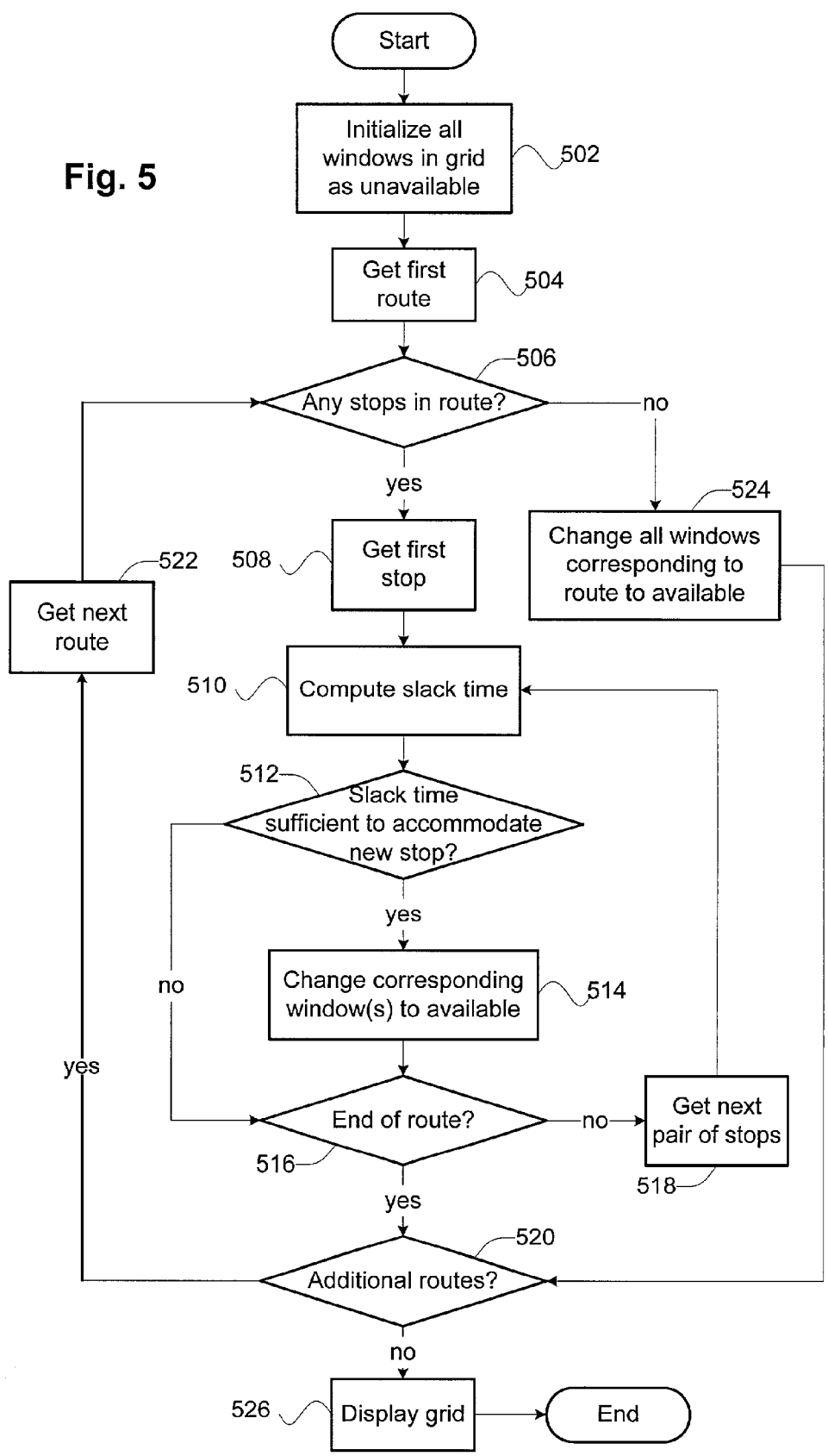
FIG. 5 is a flowchart illustrating generation of the delivery window grid according to a specific embodiment of the present invention.

Referring now to FIG. 5, initially, all of the delivery windows of the delivery window grid are designated as unavailable (502). XpBobo then gets the first route for the customer's zone (504) and if there are any stops on the route (506) XpBobo gets the first stop (508) and computes the slack time between the beginning of the route and the first stop (510). If the slack time is sufficient to accommodate insertion of the new stop without jeopardizing existing commitments to previously scheduled customers (512), the corresponding window in the grid is changed to indicate that the window is available (514). According to one embodiment, an graphical element associated with the window is presented as green rather than red to indicate its availability.

If, on the other hand, the slack time is not sufficient for insertion of the new stop (512), XpBobo determines whether the end of the current route has been reached (516). If not, XpBobo gets the next pair of stops (518), e.g., the first and second stops, and computes the slack time between the pair of stops (510). This continues until the end of the route is reached (516) at which point, XpBobo determines whether there are any additional routes for the customer's zone (520). If so, XpBobo gets the next route (522) and repeats the process described above. Where a route does not yet have any stops assigned to it (506), all of the windows in the grid corresponding to the duration of the route are changed to available (524). If no routes remain (520) the delivery window grid is displayed to the customer (526) and the process ends.

According to a specific embodiment, XpBobo uses two kinds of computations—a "forward" computation by which it computes the "earliest arrival time" at the customer's location, and a "backward" computation by which it computes the "latest arrival time" at that location.

The slack time between existing stops on a route is determined using information from the Van Stops table for the existing stops. Each stop has an associated promised delivery window and a plurality of time-based parameters the aggregation of which represents the time allotted for the stop. These parameters include drive time to the stop relative to the previous stop (or the station for the first and last stops), parking time, and service time.

When there is any slack between stops on a particular route, a driving time estimate is done to determine if there is sufficient time to insert a new stop for the user's address. According to a specific embodiment, this is done without using the absolute real time information from the Route Planner. Instead, the estimates are computed using approximations of driving speed and real-driving distances based on straight-line distances computed from latitude/longitude values. The delivery grid estimator calculates whether a stop is reachable between any two existing stops, or the station and an existing stop, or an existing stop and the station, first by computing a forward driving distance from the previous stop to compute an earliest-arrival time and then by back-computing from the next stop to compute a latest-arrival time. Using these two times and the amount of slack available, it decides whether a specific window can be shown open to the user.

If there is enough time between existing stops to drive to the new unassigned stop, park, deliver a "standard" load, and drive to the second stop without violating existing promises, e.g., the delivery window of the second stop, and if there is sufficient capacity in the van associated with the route, the associated window is presented to the user as available, e.g., the window is colored green. If there are multiple windows between the two existing stops for which this is true, all are colored green. As described above with reference to FIG. 5, this is done for each pair of existing stops on each route. More generally, if there is enough slack time in any of the van routes associated with the user's service zone for a given delivery window, that window is presented as available.

According to a specific embodiment, the delivery grid is adjusted for the open hours available for each day of the week. In the case of non-uniform hours, e.g., 9 am to 5 pm on weekends and 7 am to 10 pm on weekdays, the grid is adjusted so that the display is centered correctly and unavailable times are clearly marked as such. According to a more specific embodiment, the entire display computation is done in C++ as opposed to ASP and a precomputed grid is handed over to the ASP layer that then simply displays it as HTML.

As mentioned above, parking time and service duration parameters may be set at the zone level, the sub-zone level, and even at the customer's address level. Thus, the parking time may be set high for a particular sub-zone where parking is scarce, or the service duration for a particular customer might be set high where, for example, the stop has a lot of steps. The parking time and service duration parameters may be determined considering a customer type (e.g., business or private), and a customer rank. According to a specific embodiment, there are fixed and variable portions of the service duration parameter. That is, for example, the service duration is computed based on the number of totes being delivered to that stop.

According to a specific embodiment, the module which estimates the drive time between stops varies the average drive speed used in the calculation based on the distance between the stops. For example, the average speed used is higher when the distance between the stops is greater reflecting the fact that freeways and expressways are more likely to be used. According to an alternate embodiment, the driving time is determined with reference to the actual along-road distance.

According to a specific embodiment, if a van is determined not to have enough capacity to add the totes (initially assumed to be three totes) for the new unassigned stop, it is determined whether there is sufficient time between existing stops to drive back to the station to "recharge," i.e., pick up the additional totes. If so, and all of the other parameters fall into place, the window is indicated as available in the grid.

According to a specific embodiment, certain delivery windows in the grid include an indication that a van will be in the user's neighborhood, e.g., a house icon. Such an indication may be included where, for example, the drive time between a first existing stop and the new unassigned stop (or between the new unassigned stop and a second existing stop) is below a threshold value. Alternatively, such an icon might be displayed where, for example, the customer already has a delivery scheduled, or where it is desirable to provide incentives (financial or otherwise) to select particular windows.

According to another specific embodiment, certain delivery windows may be displayed as unavailable, e.g., colored red, even though the above-described procedure would otherwise display them as available, e.g., green. This might occur, for example, where the ratio of driving time to the available slack time exceeds some threshold. Using such a threshold avoids driving extremely long distances to serve a single stop. This approach would tend to show delivery windows as available where additional stops could be accommodated on the way to the new stop.

The capacity management service in the XP services subsystem runs periodically and queries the WS database regarding reserved tote capacity. Trucks depart the DC en route to the stations in "waves." If the tote capacity for a particular truck is exceeded by the number of orders, all of the routes corresponding to the vans delivering totes on that truck are made unavailable for further scheduling by the capacity management service, i.e., their routes are closed. The capacity management service also checks against the tote processing capacity of the DC. Customer service operators have the ability to override closed routes for preferred customers.

Customer capacity allocation is a technique by which the system rations delivery windows. According to a specific embodiment, a routine runs every night which ranks customers according to shipment frequency and average order size; the greater the frequency and larger the order size, the more highly ranked the customer. The routine also ranks the delivery windows according to how long before their scheduled time the windows fill up; the earlier filled windows being the more desirable windows. The system then allocates or reserves specific percentages of selected ranks of delivery windows to specific percentages of selected ranks customers. During generation of the delivery window grid, the customer's ranking is taken into account when determining which delivery windows to indicate as available. For example, a highly desirable window might be shown as unavailable to an infrequent customer to ensure that frequent and high volume customers have the best selection of delivery windows. However, if the desirable windows are not filled by the more highly ranked customers at some point before the delivery date (e.g., one or two days in advance), they are opened up to all customers to ensure that they are filled.

Allocation of System Capacity

An embodiment of a method for allocating the system capacity based on customer order data according to the present invention will now be described in detail. In this embodiment, the allocation of the system capacity includes the following processes: (i) associating a customer point value with each customer according to a customer point system, (ii) dividing customers into customer groups based on the customer point value, (iii) determining an actual capacity allocation distribution among the customer groups, and (iv) adjusting a demographic distribution of the customer groups.

Figures 6, 7, 8:
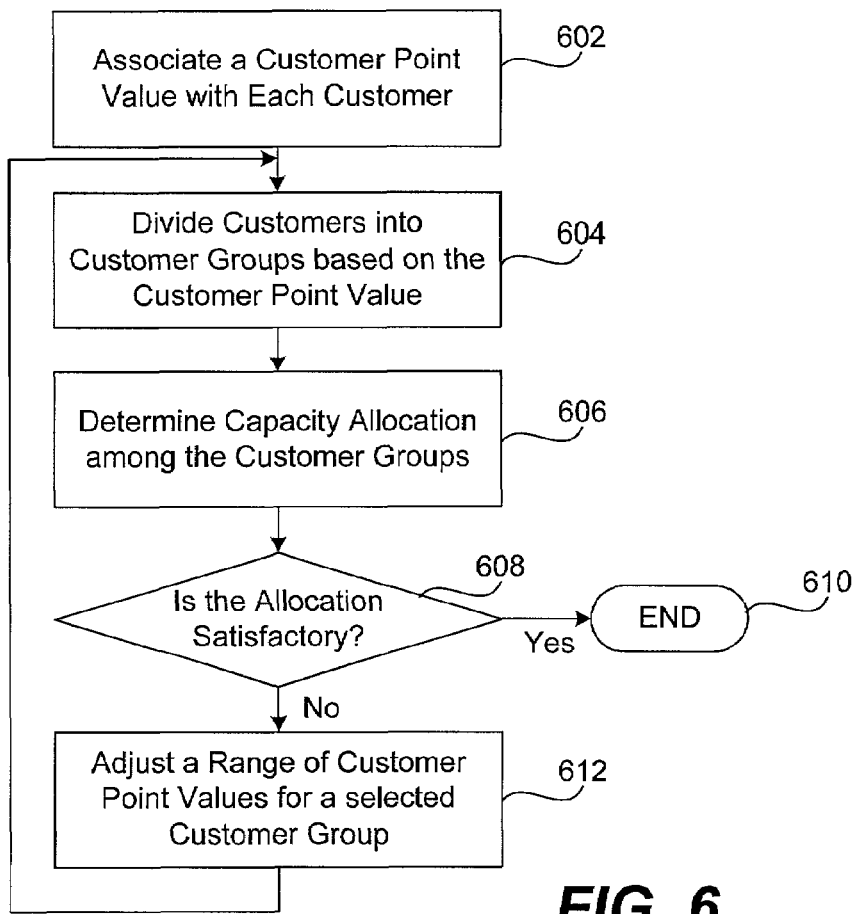
FIG. 6 is a flowchart illustrating allocation of the system capacity based on customer order data.
FIG. 7 is a factor table illustrating relationships between an average shipment size and a customer point value.
FIG. 8 is a factor table illustrating relationships between a shipment frequency and a customer point value.

FIG. 6 is a flowchart illustrating allocation of the system capacity based on customer order data. Initially, each customer is associated with a corresponding "customer point value" according to a customer point system (602). The customer point value for each customer is determined with reference to customer order data as described in detail below.

FIGS. 7 and 8 are factor tables illustrating relationships between an average shipment size and a customer point value, and between a shipment frequency and a customer point value, respectively. Each customer is associated with a customer point value based on order history for a specific period. The customer point value is determined by summation of points based on multiple factors, such as the average shipment size and the shipment frequency. In this specific embodiment, the multiple factors are two: the average shipment size and the shipment frequency. However, more than two factors can be utilized for determining the customer point value.

One factor is the average shipment size: an average dollar amount for orders made by one customer during a predetermined time window (e.g., ten weeks). In other words, the average shipment size is the total amount in dollars for orders made by the customer during the period divided by the number of the orders. For example, supposing that a customer ordered thirteen orders for ten weeks, and the total cost for the thirteen orders was $780, the average shipment size is $60. As illustrated in FIG. 7, the customer gets some customer points based on the average shipment size. The higher the average shipment size is, the higher the customer's points are. In the above case, the customer's points are 25.

Another factor which determines the customer point value is a shipment frequency, which is illustrated in FIG. 8. The shipment frequency is the number of orders per week for a customer. Similar to the average shipment size, the higher the shipment frequency is, the higher the customer's points are. For example, when a customer ordered thirteen times for the ten weeks, the shipment frequency is 1.3. In this case, the customer gets 36 points based on the shipment frequency illustrated in FIG. 8.

A level of customer activities is characterized by the average shipment size and the shipment frequency. In other words, the customer point value is a summation of points based on the average shipment size, and points based on the shipment frequency. Thus, in the above specific example, the customer is associated with a customer point value of 61 (=25+36 points), and each customer point value ranges from 0 (zero) point to 100 points. It should be noted that FIGS. 7 and 8 are specific examples of how to associate the two factors (i.e., the average shipment size and the shipment frequency) with a customer. Therefore, modification of the specific relationships shown in FIGS. 7 and 8, or addition of a weighting factor for summation of the two factors can be used, and those modification and weighting are included in the scope of the present invention.

Referring back to FIG. 6, next, each of the customers is categorized into one of customer groups based on the customer point value (604). Each of the customer groups has a corresponding range of customer point values. For example, customer groups A1–A5 have the following ranges of customer point values:

A1: 86–100,
A2: 74–85,
A3: 54–73,
A4: 31–53, and
A5: 0–30.

Thus, the customer in the above example with 61 points is categorized into customer group A3. It should be noted that the customer groups can be divided into different number of groups, i.e., less than five groups or more than five groups.

FIG. 9 is a table illustrating an example of customer point values, customer groups, override groups, and override expiration dates. The customer table 900 has a customer column 902, a customer points column 904, a group name column 906, an override group name column 908, and an override expiration data column 910. The customer table 900 has also a plurality of customer rows 910. Each row contains a customer name, a customer points, a group name, an override group name, and an override expiration data associated with a customer. Any part or all of the customer data shown in FIG. 9 can be stored in a computer readable media (e.g., a semiconductor memory or a magnetic/optical disk drive) included in a computer system for performing the allocation of the system capacity. As illustrated in FIG. 9, each customer is associated with a corresponding customer points. For example, the above customer having 61 points, "Mary Smith" is categorized into the customer group "A3." Thus, the customer "Mary Smith" is associated with the customer group "A3" in the customer table.

A customer service officer (CSO) can override a group name, which is stored in the override group name column 908 with the override expiration date 910. For example, as shown in FIG. 9, the CSO can "upgrade" the customer John Doe from the group name 906 (i.e., A4) to the override group name (i.e., A3) until the override expiration date 910 (i.e., Sep., 30, 1999). After the override expiration date 910, the customer John Doe is treated as an A4 customer, which belongs to the original group name 906. Conversely, when the CSO "downgrades" the customer Joe Smith from A1 to A3 until Dec. 31, 1999, the system does not use the downgraded group name (i.e., A3) since the overridden group is lower than the original group. In other words, the system uses a dominant group name between the original group name and the overridden group name. The CSO can upgrade a customer's group (e.g., the customer Sunil Bhargava's group name A3) with no expiration date. This privilege of no expiration date for overriding is given to a "preferred customer," who is determined to, for example, have made sufficient amount of orders with sufficient frequency for a sufficient length of time. The system typically indicates the CSO's name who overrides the customer's group, and date of the last change.

Referring back to FIG. 6, an actual capacity allocation distribution among the plurality of customer groups is determined utilizing the computer system according to the present invention (606). FIG. 10 is a diagram illustrating an exemplary capacity allocation history screen 1000 for use with the computer system of an embodiment of the present invention. As shown in FIG. 10, a manager first inputs a begin data 1002 and a end data 1004 from a computer connected to the system. A capacity allocation history screen 1000 shows each group 1010, minimum points 1012 corresponding to the group 1010, a target capacity allocation 1014, and actual results 1020. The actual results include total customers 1022, and total orders 1024.

An Area Customer Manger (ACM) enters the number of days to be used when calculating points per customer. For example, if the ACM decides that customer order data should be used for 90 days, the ACM inputs 90 (days) as the number of days for calculations. Then, the system of the present invention uses the customer order data for the last 90 days in its calculation from the day of calculation.

The capacity allocation history screen 1000 shows a "new customer" group 1030. The new customer group 1030 is a category corresponding to those of the customers who have been "associated with the computer system" less than a predetermined period of time. In this specific embodiment, the ACM enters the number of days from first shipment to qualify as a "new customer." In this specification, a customer is associated with the system when the customer's first shipment was delivered (i.e., when the customer's earliest purchase occurs). If a customer is qualified as the new customer group 1030 because the specific days have not passed since the first shipment was delivered, then the customer is categorized into the new customer group 1030 irrespective of the customer point value. For example, if the ACM enters 60 days for the "new customer age," and a customer's first shipment was delivered 55 days ago, that customer belongs to the new customer group 1030. Although the new customer group 1030 is positioned between the groups A1 and A2 in this specific embodiment, the new customer group 1030 can be ranked between other groups. In this specific embodiment, the new customer group is determined without reference to the customer point system. In other words, as long as a customer is qualified based on the number of days since the customer's first delivery, the customer is categorized into the new customer group regardless of the customer point value. Thus, a customer belongs to the new customer group if the customer satisfies the new customer age requirement described above, irrespective of how much customer point value the customer obtains.

The target capacity allocation 1014 is determined by various marketing and administrative factors, and dependent on how much the specific customer group should be preferred. For example, when the group A1 should be preferred as loyal customers, the ACM sets the target capacity allocation 1014 for the group A1 relatively high.

The total customers 1022 and the total orders 1024 in the actual results 1020 are calculated for each customer group by percentage with respect to the total number of the customers (i.e., 23,000) and the total number of orders (i.e., 5,234), respectively. For example, the group A1 has 5,290 customers and 1,780 orders from the begin date 1002 to the end date 1004. The corresponding percentage values for the customers and the orders are 23% (=5,290/23,000) and 34% (=1,780/5,234), respectively.

The ACM determines an actual capacity allocation distribution among the plurality of customer groups with reference to the customer order data including the average shipment size, the shipment frequency, the qualification as a new customer, and the override group name. The ACM reviews the capacity allocation history screen 1000 considering whether or not the actual results 1020 are satisfactory distribution compared to the target capacity allocation 1014. If the ACM finds the actual results 1020 unsatisfactory based on the target capacity allocation 1014, the ACM can adjust the ranges of the customer point value corresponding to the customer groups so that the actual capacity allocation distribution to converge to the target capacity allocation distribution. In this specific embodiment, the actual capacity allocation distribution is represented by the number of the customers and the number of the orders. However, it will be understood that other parameters such as total dollar amount can be taken into consideration when reviewing the actual capacity allocation distribution.

The computer system of the embodiment according to the present invention displays a demographic distribution curve of customers in a particular group with respect to their customer point values. For example, if the distribution curve for the group A2 is centered at 77 points, and a large percentage of the customers in the group A2 ranges from 75–80 points, then the ACM would not want to split the group up at 77.

Next, the ACM determines whether the system capacity allocation is satisfactory (608). This determination is made by the ACM in this specific embodiment. However, it should be noted that the determination can be made by the computer system for use with the present invention based on how close the actual results 1020 are to the target capacity allocation 1014. If the decision at 608 is "YES," then the allocation of the system capacity is finished (610). If the decision at 608 is "NO," then the ACM adjusts the range of the customer point value for a selected customer group (612). This is done by, for example, adjusting the minimum points 1012.

Then, the computer system for use with the present invention iterates from dividing the customers into the customer groups (604) based on the modified minimum points 1012. This iteration is performed until satisfactory convergence of the actual capacity allocation distribution 1020 to the target capacity allocation distribution 1014.

FIG. 11 is a worksheet 1100 to plan groupings displayed on the computer screen for use with the present invention. A recalculation results 1102 includes modified minimum points 1104 for the customer groups 1010, and changed total customers 1106 as a result of the modification of the minimum points 1104. In FIG. 11, the modified minimum points 1104 shows a new minimum points, namely 88 points, for the group A1 which is entered by the ACM. According to the new minimum points 1104, the computer system of the present invention categorizes all the customers into the customer groups with the modified set of the minimum points 1104. The system recalculates the number of customers in each customer group and the percentage of each customer group, and displays these numbers and percentages in the total customers section 1106 in the worksheet 1100 on the computer screen. The worksheet 1100 is accompanied by a recalculate icon 1120 and a submit icon 1122 for instructing the system to recalculate the results based on the new minimum points and to submit the new minimum points to the system, respectively.

It is noted that the group A5 has minimum points of zero. Thus, all active customers fall into one of the groups. In this specific embodiment, the customers are categorized into five customer groups. However, in order to avoid heavy prioritization for higher customer groups, the ACM can make, for example, only two customer groups A1 and A2 with a new customer group. In this case, only one group of customers will see reduced availability of delivery windows in a window grid, and the reduction is modest. As the user of the system of the present invention gains experience of system capacity allocation management, the user may choose to make more customer groups, and add priority for customers in higher customer groups.

FIG. 12 is a worksheet 1200 to allocate capacity displayed on the computer screen for use with the present invention. The ACM enters the number of expected orders 1202 in the worksheet 1200. The computer system for use with the present invention displays the customer group 1010, and the target capacity allocation 1012 inputted by the ACM, and calculates the total customer numbers 1204 based on the given minimum points for each customer group. For example, the customer group A1 has 5,040 customers in total, which corresponds to 21% of the total customers (i.e., 24,000). Then, the system calculates target orders in number 1206 based on the expected number of orders 1202 and the target capacity allocation 1012. For example, the target orders in number 1206 for the customer group A1 are 5,760 (=18,000×032). The system calculates target orders per week, per customer 1208 by dividing the target orders in number 1206 by the total customer numbers 1204. For example, The target orders per week, per customer 1208 for the group A1 is 1.1 (=5,760/5,040). The worksheet 1200 is accompanied by a recalculate icon 1220 and a submit icon 1222 for instructing the system to recalculate the results based on the new minimum points and to submit the results to the system, respectively.

In this specific embodiment, a portion of the method of allocating system capacity according to the present invention is performed manually. Specifically, in the embodiment, the adjusting the minimum points 1012 based on the actual results 1020 is performed manually by the ACM. However, it will be understood that the method according to the present invention can be entirely automated by a computer system which determines the allocation of system capacity based on similar criteria and data on which the ACM relies when allocating.

The capacity allocation report for a certain period of time is generated based on the group setting which has not been modified during that period of time. If the capacity allocation report is based on the group setting which has been modified during the period, the capacity allocation report can be misleading. Therefore, in this specific embodiment, the capacity allocation report is generated for a predetermined time window (e.g., one week) based on the group setting which is the same throughout that time window.

A Customer Service Manager (CSM) can request an override report to be issued from the system using graphical user interface of the system or a printer. The override report shows the existing overrides, the CSO name who made the overrides, and the date when the overrides were made so that CSM can review the overrides of the customer's group name.

Generating Window Grid

Generating delivery window grid in a specific embodiment of the present invention will now be described in detail below. FIG. 13 is an exemplary view of delivery window grid 1300 generated by the system of the present invention. The delivery window grid 1300 has rows for seven days from the time when a user sees, and columns for half-hour delivery windows. For the sake of simplicity, FIG. 13 shows only a part of the delivery window grid 1300. According to a specific embodiment of the method for allocating system capacity of the present invention, the system capacity includes delivery resources capacity. Specifically, in this embodiment, the system for use with the present invention allocates delivery resources capacity based on a customer group corresponding to a customer.

Figure 14:
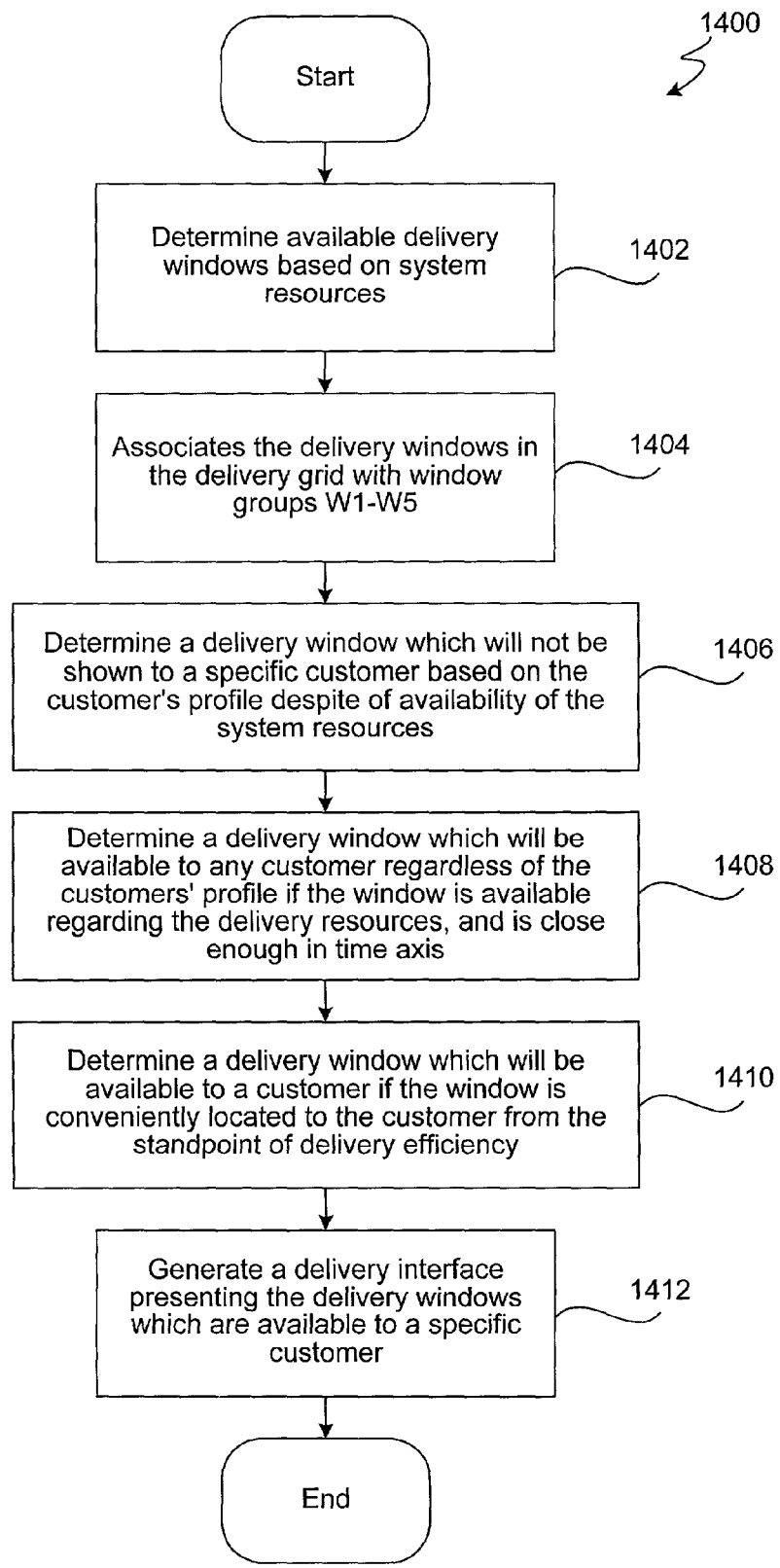
FIG. 14 is a flowchart illustrating generation of the window grid based on currently available system resources and a customer profile according to a specific embodiment of the present invention.

FIG. 14 is a flowchart illustrating generation of the window grid based on currently available system resources and a customer profile (1400) according to a specific embodiment of the present invention. In one specific embodiment of the method according to the embodiment, the generation of the window grid 1400 is performed between blocks 520 and 526 in FIG. 5.

A specific delivery window is not available if delivery resources are not available for the delivery window. For example, if no vans for delivery are available for the delivery window, the delivery window is not available for all customers. Delivery windows which are not available solely due to the lack of delivery resources are designated as "X" in the window grid 1300. The computer system first determines available delivery windows based on system resources (1402) by utilizing the embodiment of the method according to the present invention described above referring to FIGS. 4 and 5. The "X" delivery windows 1302 are not available for all the customers. However, as described below, there are cases in which a delivery window available in terms of the delivery resources is not available to some users depending on the users' customer profile. This delivery resources requirement is absolute, and thus, other factors cannot override the "X" delivery windows.

The system for use with the present invention associates the delivery windows in the delivery grid 1300 with window groups W1–W5 (1404). The window groups W1–W5 represent how "popular" a delivery window is. In other words, if a delivery window of a specific day (e.g., Friday) and a specific time of the day (e.g., 5:30 pm–6:00 pm) is selected long ahead of time or selected without fail, that delivery window is popular, and thus, is categorized in a higher window group (e.g., W1). The system stores the window groups for all the delivery windows which are presented to the users although these window rankings are not shown to the users of the system.

The system does not present a delivery window to a user when the window group of the delivery window is higher than the customer group of the customer. In other words, the system determines some delivery windows which will not be shown to a specific customer based on the customer's profile despite of availability of the system resources (1406). For the sake of explanation, suppose that the customer groups A1–A5 are assigned to integers 5-1, respectively, and the window groups W1–W5 are assigned to integers 5-1, respectively. A delivery window is presented to a customer if an integer corresponding to the customer is equal to or larger than an integer corresponding to the delivery window. For example, if a customer belongs to the customer group A1 (=5), and a delivery window belongs to the window group W1 (=5), the delivery window is presented to the customer. Conversely, if the customer belongs to the customer group A2 (=4), and the delivery window belongs to the window group W1 (=5), the delivery window is not presented to the customer. Thus, an A1 (=5) customer sees all the available windows (=1, 2, . . . , 5) (i.e., all windows other than unavailable windows due to lack of the delivery resources). An A5 (=1) customer sees only W5 (=1) delivery windows. A delivery window 1304 designated by "(X)" is a delivery window which is made unavailable based on this comparison between the customer group and the window group. However, this determination based on the comparison is overridden by some factors as described below.

There are exceptions to the rule of comparison between the customer group and the window group stated above. One such instance occurs when a delivery window is close enough to the time when the customer sees the delivery window grid 1300. For example, the system may make a delivery window available to all customers regardless of their customer group names when the delivery window is available with respect to the delivery resources, and the delivery window is close enough (e.g., within 6 hours from the time the user sees the delivery window grid) (1408).

Another instance occurs when a delivery window is preferable to be presented to the customer from the standpoint of efficiency of delivery (1410). This happens, for example, when a close delivery window in the time axis has been already reserved to a customer whose delivery point is close to the user who sees the delivery window grid 1300. In other words, if there is a delivery window in which a customer geographically close to the user is going to receive delivery, the system make the delivery window available to the user, thus efficiently packing geographically close deliveries into time slots close to each other in the time axis. In such a case, the system recommends the user to pick up the preferable delivery window by indicating a green house symbol in the delivery window grid 1300 shown on a web page. In FIG. 13, the green house symbol is represented by a delivery window 1306 with "H."

The computer system according to the embodiment of the present invention finally generates a delivery interface presenting the delivery windows which are available to a specific customer based on the criteria described in the foregoing paragraphs referring to FIGS. 13 and 14 (1412).

The specific embodiment of the method according to the present invention may utilize weighting factors to further prioritize among the customer groups. Suppose that 100 delivery windows are available to a customer after comparison between the customer group of the customer and the window group for each delivery window. The system can limit the 100 delivery windows by multiplying a weighting factor depending on the customer group to which the customer belong. For example, the 100 delivery windows multiplied by 1.0, i.e., 100 delivery windows are available to an A1 customer, where the weighting factor is 1.0. The 100 delivery windows multiplied by 0.8, i.e., 80 delivery windows are available to an A2 customer, where the weighting factor is 0.8. Multiplying weighting factors prioritizes the customers in different customer groups.

The method of the present invention described above is implemented by a computer, which generates a delivery interface in which delivery windows are presented on a remote platform via a wide area network including the Internet.

The computer system for use with the present invention may indicate a customer's current status on the customer group with which the customer is associated. Specifically, in the embodiment described above, the delivery interface indicates information based on the group name of the customer. Alternatively, the system may indicate how much more orders in dollars or frequency will put the customer into the next higher customer group. For example, the system can generate a message to the customer saying, for example, "To achieve the premier club, you need to order more than $ [dollar amount] by [date]." These messages about the current status of the customer may encourage the customer to purchase more.

While the invention has been particularly shown and described with reference to specific embodiments thereof, it will be understood by those skilled in the art that changes in the form and details of the disclosed embodiments may be made without departing from the spirit or scope of the invention. For example, the system described above with reference to FIG. 1 is only one system configuration in which the techniques described herein may be implemented. In addition, the scheduling techniques described herein may also be used for the scheduling of things other than deliveries. For example, the scheduling of appointments could be achieved using the techniques described herein. Therefore, the scope of the invention should be determined with reference to the appended claims.

What is claimed is:

1. A computer-implemented method for scheduling delivery of products, comprising:
   receiving a piece of information regarding a customer;
   displaying a plurality of available delivery windows to the customer based on the piece of information regarding the customer;
   receiving from the customer a selection of a delivery window from the plurality of available delivery windows to fulfill an order for the customer; and
   identifying a route from a plurality of routes to deliver the order based on the selected delivery window,
   wherein the method further comprises
   associating a customer value with each of a plurality of customers based on information in customer order data;
   dividing the plurality of customers into at least two customer groups, each customer group corresponding to a range of customer values, each customer being assigned to one of the plurality of customer groups according to the associated customer value; and
   determining an actual capacity allocation distribution among the plurality of customer groups based on information in the customer order data so as to adjust at least the range of customer values associated with one customer group, wherein at least one of the windows available for the customer to select depends on the customer group to which the customer is assigned and the adjusted range of customer values,
   wherein at least one product is held in inventory in anticipation of customer demand, and
   wherein the method is implemented by one or more computing devices.

2. The method of claim 1 wherein the plurality of customer groups includes a new customer group corresponding to those of the plurality of customers associated with the system less than a predetermined period of time.

3. The method of claim 1 further comprising associating a customer group override with selected ones of the plurality of customers, and allowing a delivery window to be available for the selected ones of the plurality of customers being done with reference to the customer group override.

4. The method of claim 1 wherein information in the customer order data for each customer comprise at least one of customer order size and customer order frequency.

5. The method of claim 1 further comprising adjusting the range of customer values associated with one customer group to cause the actual capacity allocation distribution to converge to the target capacity allocation distribution.

6. The method of claim 1 wherein the range of customer values associated with selected customer groups is adjusted manually to cause the actual capacity allocation distribution to converge to the target capacity allocation distribution.

7. The method as recited in claim 1,
   wherein the plurality of delivery windows are transmitted to a remote platform via a wide area network for presentation to the customer, and
   wherein the method further comprises determining which of the plurality of windows are available for delivery of the order with reference to currently available system resources.

8. The method as recited in claim 1,
   wherein the customer is associated with a group name and a customer group override, and
   wherein the at least one of the windows that the customer can select for delivery is determined based on which of the group name and the customer group override is dominant.

9. The method as recited in claim 8, wherein the customer group override is associated with an override expiration date, after which the group name dominates the customer group override.

10. The method as recited in claim 1 wherein the identifying process favors a route that already has at least one previously scheduled stop to fulfill another customer order over another route that does not have any previously scheduled stop.

11. The method as recited in claim 1 further comprising considering space on a transportation vehicle to deliver products to the customer based on the customer order in view of at least one other order to be serviced by the transportation vehicle for the identified route.

12. The method as recited in claim 1 further comprising determining if there is enough time to deliver the order without violating an existing promise to another customer on the identified route.

13. The method as recited in claim 1 further comprising providing an indication that a transportation vehicle will be in the customer's neighborhood.

14. The method as recited in claim 1 further comprising avoiding driving long distances to deliver just the order of the customer.

15. The method as recited in claim 14 wherein to avoid such driving, the method further comprises determining the ratio of driving time to the available time to deliver the order for the identified route.

16. The method as recited in claim 1 further comprising displaying a window for the customer although the window should not be available to the customer group in which the customer is assigned, if the window is still available to another customer group after a certain predetermined period of time has elapsed.

17. The method as recited in claim 1 further comprising keeping track of the current state of all delivery windows.

18. The method as recited in claim 1 further comprising providing a message to the customer that the customer's status could be improved if the customer orders more than a certain dollar amount by a certain time.

19. A computer-implemented method for scheduling delivery of products, comprising:

receiving a piece of information regarding a customer;

displaying a plurality of available delivery windows to the customer based on the piece of information regarding the customer;

receiving from the customer a selection of a delivery window from the plurality of available delivery windows to fulfill an order for the customer; and identifying a route from a plurality of routes to deliver the order based on the selected delivery window, wherein at least one of the windows available for the customer to select depends on assigning the customer to one of a plurality of customer groups based on a value of the customer, each customer group corresponding to customers within a range of values, with at least one of the ranges of values determined based on customer order data, wherein at least one product is held in inventory in anticipation of customer demand, and wherein the method is implemented by one or more computing devices.

20. A computer-implemented method as recited in claim 19, wherein the plurality of available delivery windows displayed to the customer depend on the customer group the customer has been assigned.

21. A computer-implemented method as recited in claim 20, wherein each customer group corresponds to a group of delivery windows, and wherein at least one delivery window corresponds to at least two customer groups.

* * * * *